United States Patent [19]

Gapp et al.

[11] Patent Number: 4,909,690
[45] Date of Patent: Mar. 20, 1990

[54] COMPOSITE FASTENER

[75] Inventors: Roland H. Gapp, S. Lacuna; Clyde Simmons, Riverside, both of Calif.

[73] Assignee: Textron Inc., Providence, R.I.

[21] Appl. No.: 133,550

[22] Filed: Dec. 16, 1987

[51] Int. Cl.⁴ .............................................. F16B 35/00
[52] U.S. Cl. ..................... 411/411; 411/908; 411/900; 411/424; 428/112; 428/113
[58] Field of Search ............. 411/378, 411, 908, 900, 411/903, 904, 907, 424; 428/105, 107, 112, 397, 400, 113

[56] References Cited

U.S. PATENT DOCUMENTS

| | | | |
|---|---|---|---|
| 2,901,455 | 8/1959 | Jurras | 428/112 X |
| 2,943,967 | 7/1960 | Simon | 411/908 X |
| 2,949,054 | 8/1960 | White | 411/418 |
| 3,495,494 | 2/1970 | Scott | 411/411 |
| 3,995,092 | 11/1976 | Fuchs | 411/900 X |
| 4,576,847 | 3/1986 | Tajima | 411/411 X |
| 4,623,290 | 11/1986 | Kikuzawa et al. | 411/908 X |
| 4,717,302 | 1/1988 | Adams et al. | 411/903 X |

FOREIGN PATENT DOCUMENTS

| | | | |
|---|---|---|---|
| 558892 | 2/1975 | Switzerland | 411/908 |
| 1155708 | 6/1969 | United Kingdom . | |
| 1364076 | 8/1974 | United Kingdom | 428/112 |

Primary Examiner—Gary L. Smith
Assistant Examiner—F. Saether
Attorney, Agent, or Firm—Knobbe, Martens, Olson & Bear

[57] ABSTRACT

A threaded fastener is made of a composite material made of layers extending parallel to the fastener axis and having elongated filament fibers. A portion of the fibers extend parallel to the axis of the fastener to provide tensile and shear strength to the fastener, and a portion of the fibers extend parallel to the load-bearing thread faces to enhance tensile strength to the threads.

23 Claims, 5 Drawing Sheets

COMPOSITE FASTENER

FIELD OF THE INVENTION

This invention relates to composite materials, and particularly to articles made of such materials as threaded fasteners useful in aircraft construction.

BACKGROUND OF THE INVENTION

A composite material is a physical combination of two or more materials, both of which are usually visible to the naked eye. A very early example is the use of straw, in biblical times, to reinforce mud bricks for building. More recent examples are the use of steel bars to reinforce concrete and the use of glass fiber to reinforce polyester resin in the making of boats and also the use of carbon fiber to reinforce various resins for aircraft construction.

The use of composite materials in military fighter aircraft has increased very rapidly in the last 20 years. For instance, in the F14, which is a 20-year-old design, 0.8% of the total structural weight of the aircraft was made from composite. In the F15, 1.6% was composite; in the F16, 2.5%; in the F18, 9.5%; and in the ATF, which is now being designed, 50% of the aircraft structural weight is expected to be composite. In large transport aircraft in 1985, 3% of the aircraft's structural weight was composite and, by 1995, this percentage is expected to increase to 65% unless the development of aluminum lithium alloys is successful, in which case, the 65% figure will be reduced somewhat. All the above Figures are based upon estimates by industry sources and while that may not be precisely correct they will serve to indicate a trend.

It had been hoped that these composite structures could be held together by adhesives, but this has not been found practical. In conventional aluminum aircraft, approximately 25 fasteners per square foot of external surface area are used. In composite aircraft, it is still necessary to use approximatley 12 fasteners per square foot of outside surface area. These figures represent one industry's estimate.

Up to the present time, specially-shaped and modified metal fasteners have been used in composite structures. These fasteners have been reasonably satisfactory, but they are now seen as being, in many cases, unnecessarily strong, unnecessarily heavy, unnecessarily expensive and undesirably reflective to radar detection devices. Thus, a need exists for a non-metallic fastener which is sufficiently strong but yet lighter and less expensive than metal. The particular type of fastener desired is an aircraft threaded shear pin and collar, more commonly referred to as a "nuts" and "bolts."

Plastic materials have been used for nuts and bolts, but those unreinforced materials that have been produced in the past have not been strong enough for use as aircraft fasteners. Typically, such non-aircraft fasteners have possessed shear strengths of around 5-10 KSI (thousand sounds per square inch). Recently, injection-molded fiber reinforced nuts and bolts have been produced having shear strengths in the range of 9-18 KSI and tensions strengths around 4-14 KSI. These are satisfactory for aircraft use in some applications. Also, compression-molded fasteners reinforced with glass or carbon filament fiber have been produced with shear strengths in the range of 13-40 KSI, and these may find considerable use in aircraft. However, the tension strength of these compression-molded fasteners is low due to the difficulty of producing screw threads containing sufficient reinforcing fibers which are oriented in the direction needed to provide the tension strength. For this reason, the threads strip from the main shaft of the bolt at tension values in the range of 4-19 KSI.

Accordingly, a need still exists for improved non-metallic fasteners having the necessary strength characteristics.

SUMMARY OF THE INVENTION

In its simplest form, the invention comprises an elongated cylindrical pin formed of plies of fiber reinforced tape that are bonded together to form a rigid composite structure, with the plane of the plies being parallel to the longitudinal axis of the pin. The tape plies include elongated filament fibers which extend generally parallel to each other, and which are coated and joined with a resin or other suitable bonding agent. These plies are oriented such that their fibers maximize the strength of the pin. In accomplishing this, a portion of the plies are oriented so that their fibers extend generally parallel to the pin axis, and a portion of the plies are oriented so that their fibers in the plane of the tape are angled with respect to the axis.

The angled fibers, in a preferred form of the invention, are arranged so as to be parallel to the loadbearing face of threads formed on the pin. With such construction, the fibers on that surface of the thread extend generally radially inwardly to the axis to best prevent the threads from shearing too easily. In a specific arrangement, a ply adjacent a central plane parallel to the plies and through the pin axis has its fibers extending at an angle with respect to the axis. That angle is equal to the angle of a thread formed on the pin. For example, if the thread face is 60° with respect to the axis, the angled threads are at 60°, and thus are parallel to the load-bearing face of the thread. The next ply, positioned outwardy from the first ply, preferably has its fibers extending parallel to the pin axis, and the next pair of plies have their fibers angled to be parallel to the load-bearing face. This sequence is continued to the edge of the pin, except that the outermost plies preferably have their fibers extending parallel to the axis. Also, the plies with the angled fibers starting from the central plane and counting outwardly are progressively provided with fibers that are angled at an increasing angle with respect to the axis. This arrangement is needed to keep the fibers parallel to the load-bearing thread faces.

In accordance with a preferred method of the invention, the composite material for the pin is made by stacking tapes having a plurality of fibers that are joined by resin or other suitable bonding agent. A stack of these tapes of the desired height are then bonded together by heat and pressure. This creates a panel of a desired thickness and length and width. The tapes are oriented so that the fibers extend in the desired manner. Thus, as an example, the first tape at the center of the panel is positioned with its fibers angled at the desired thread angle to an axis which will ultimately be the axis of the pin to be formed. The next tape is positioned with its fibers extending parallel to the axis. The third and fourth tapes are positioned with their fibers extending at the same angle with respect to the axis, but at one is a positive angle and the other negative. Such angle is slightly greater than the angle of the first tape. This sequence is continued for the desired thickness, except that the outermost tapes are preferably arranged with their fibers extending parallel to the axis.

After the panel has been formed, an elongated pin or section of the panel is cut from one edge parallel to the axis. Thus, the the plane of the plies in that square pin extend parallel to the axis. The pin is then machined into a cylindrical shape, and threads are formed thereon by machining or by warm forming.

SUMMARY OF THE DRAWINGS

FIG. 7 is an enlarged view of the thread profile of the fastener shown in FIG. 6a.

DETAILED DESCRIPTION OF A PREFERRED EMBODIMENT

The bolts of this invention are made from this tapes containing fibers which add to the strength of the tapes. In a prototype of the invention the tapes employed have a thickness of about 0.005 inch, but other thicknesses can be utilized. An enlarged schematic illustration of such tapes is shown at 10, 12, 14 and 16 in FIG. 5. The fibers in 12 are parallel to what will become the axis of the bolt and are referred to as running in the 0° direction. Each tape contains a plurality of longitudinally extending continuous fibers 18. One example of this utilizes carbon filament fibers coated with a suitable polymeric resin 20 such as PEEK (Poly-Ether-Ether-Ketone).

Figure 3:
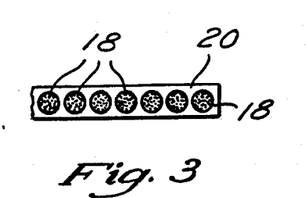
FIG. 3 is an enlarged end view of the tape used in making the panel of FIG. 1.

FIG. 3 schematically illustrates an enlarged end elevation of a portion of such tape material. The fibers are illustrated with a circular configuration in FIG. 3 and with each fiber being composed of additional filaments. The exact physical configuration of such filaments of this commercially available tape need not be described for the purposes of this invention, but it is important to appreciate that the continuous fibers extend generally parallel to each other and greatly increase the tensile strength of the tape in that direction, and also the shear strength perpendicular to the fibers.

Figure 1:
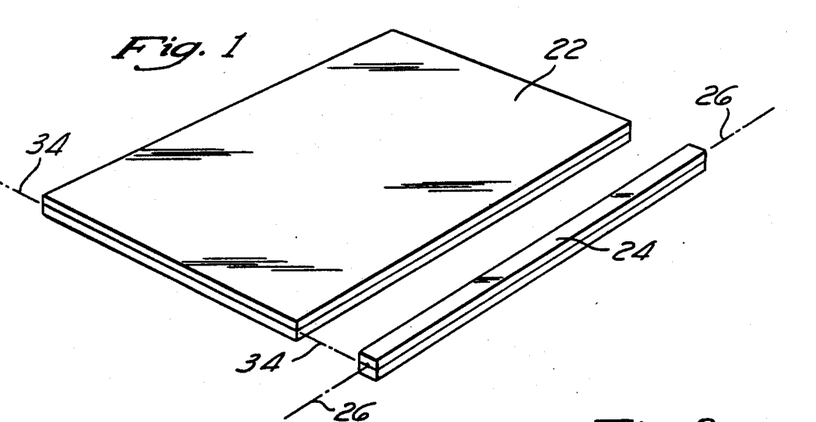
FIG. 1 is a perspective view of a panel made of composite material used for making threaded fasteners of the invention.
Figure 2:
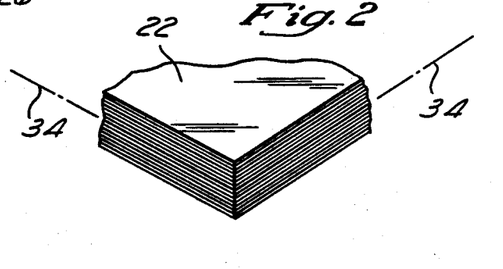
FIG. 2 is an enlarged, perspective view of a portion of the panel shown in FIG. 1.

The tapes can be made into panels, one of which is illustrated at 22 in FIG. 1. To make a panel ⅛ inch thick, approximately 100 plies of 0.005 inch in thickness are stacked one on top of the other, as more clearly seen in FIG. 2. The stack is then heated while applying a compressive load followed by cooling. This creates a rigid composite panel having the desirable characteristics discussed above.

To use the material to make a bolt, a section or rod 24 of the material is cut from the edge of the panel in the 0° direction as indicated in FIG. 1. The rod can then be machined by grinding or turning on a lathe to produce a round cross section. To make a quarter inch diameter bolt, a ½ inch thick panel may be sliced into ¼ inch widths to provide a ¼ by ¼ square cross section rod. This rod may be machined to produce a round cross section ¼ inch bolt with a ½ inch diameter head. The same ¼ inch diameter bolt can be made from a ¼ inch diameter round rod made from a ¼ inch thick panel, which is then warmed and pressure formed to produce a ½ inch diameter head.

Figure 4:
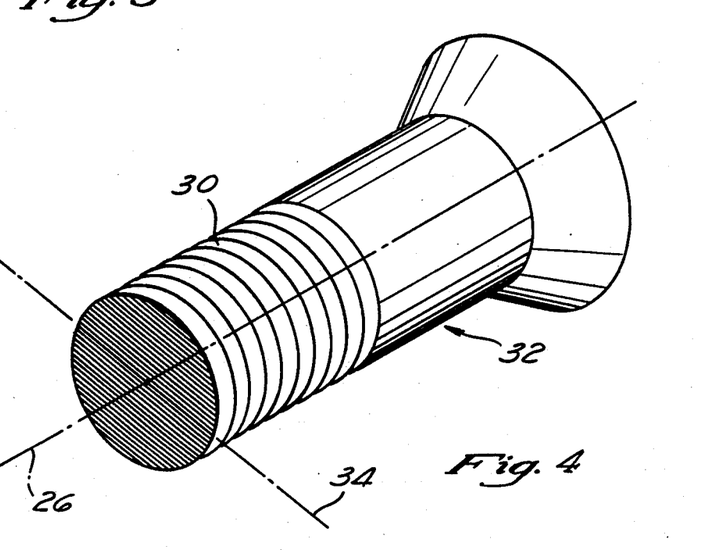
FIG. 4 is a perspective view of a fastener made of composite material in accordance with the invention.

The bolt threads 30 schematically shown on the fastener 32 in FIG. 4 may be cut by machining or grinding, or they may be formed by warm upsetting in a die.

It has been discovered that in order to provide good shear strength together with threads having improved tension strength, optimum fiber arrangement is needed. Bolts made from carbon filament reinforced PEEK, according to the teachings of this invention, have been found to have shear strengths in the range of 30–51 KSI and tension strengths in the range of 21–49 KSI. Such strengths are quite satisfactory for aircraft usage.

Figures 5, 6:
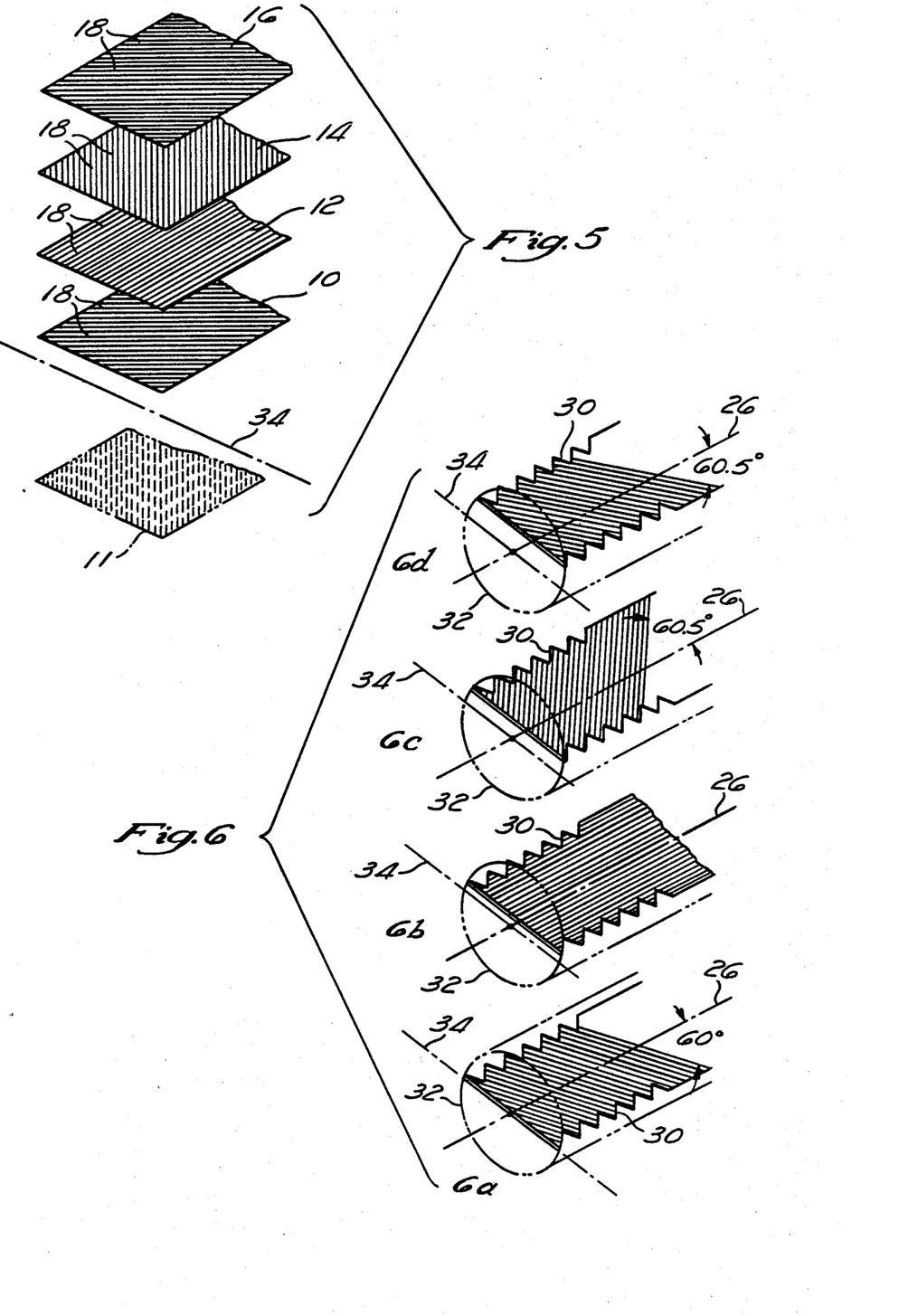
FIG. 5 is an exploded perspective view illustrating the orientation of the fibers in the tapes used to form the panel of FIG. 1.
FIG. 6 is a perspective, cross-sectional view of the fastener of FIG. 4 at four different parallel planes taken at increasing distances from a horizontal plane through the fastener.

As previously mentioned, to make a ¼ inch thick panel, approximately 50 plies are used, 25 plies on each side of a center plane 34. counting plies from this center plane outward as illustrated in FIG. 5, the first ply 10 is laid with its fibers 18 at +60° to what becomes the longitudinal axis 26 of the rod 24 cut from the panel. This the longitudinal axis 26 also becomes the axis of the bolt as illustrated in FIGS. 4 and 6. This angular orientation of the fibers in the ply 10 is also illustrated in FIG. 6.

The second ply 12 is laid with its fibers at 0° to the longitudinal axis 26 as seen in FIG. 5 and 6b. The third ply 14 is laid so that its fibers angle at 60.5° in a negative direction, opposite to the fibers in the ply 10. A positive angle is one extending to one side of the axis 26 and a negative one is to the other side. The fourth ply has its fibers positioned at +60.5° to the axis in the same general direction as the fibers of the first ply.

Continuing outward, the fifth ply (not precisely shown) has its fibers at 0°. With each ply having a thickness of approximately 0.005 inch, the top surface of the fifth ply would be at 0.025 inch from the horizontal plane. This sequence of a ply with 0° fibers followed by plies with fibers at a desired + or − angle orientation with respect to the axis is then repeated, but with increasing angles with respect to the axis for the angle plies. Thus, the sixth and seventh plies have their fibers at ±61, eighth ply at 0°, ninth and tenth plies at ±62°, eleventh ply at 0°, twelfth and thirteenth at ±63.5°, fourteenth at 0°, fifteenth and sixteenth at ±66°, seventeenth at 0°, eighteenth and nineteenth at ±71.5°, twentieth at 0°, twenty-first and twenty-second at ±81°, twenty-third, twenty-fourth and twenty-fifth at 0°. Such a stack would create a thickness of ⅛ inch.

A mirror image of the 25 plies making up the first ⅛ inch thickness is laid up counting from the same center plane outwardly to make a second ⅛ inch thickness. When completed, a ¼ inch thick panel will result.

The reason for the 0° plies is to provide good shear and tension values on the basic unthreaded rod material. The reason for the 60°–81° angles is to provide a maximum number of uncut fibers in the threads when the threads are cut onto the rod.

When threads are warm formed onto a rod, the rod's outside diameter is reduced from 0.250 to 0.210 diameter in the vicinity of the threads. Also, the ¼ inch laid-up panel from which the blank or forming is made has plies 20, 21, 22, 23, 24 and 25 laid in the 0° orientation. The fibers in these zero oriented plies are formed into the threads in the dye cavity and provide greater thread tensile strength than would be provided if ply 21 and 22 were at 81°. Plies 23, 24 and 25 are laid at 0° whether the threads are cut or formed.

Figure 14:
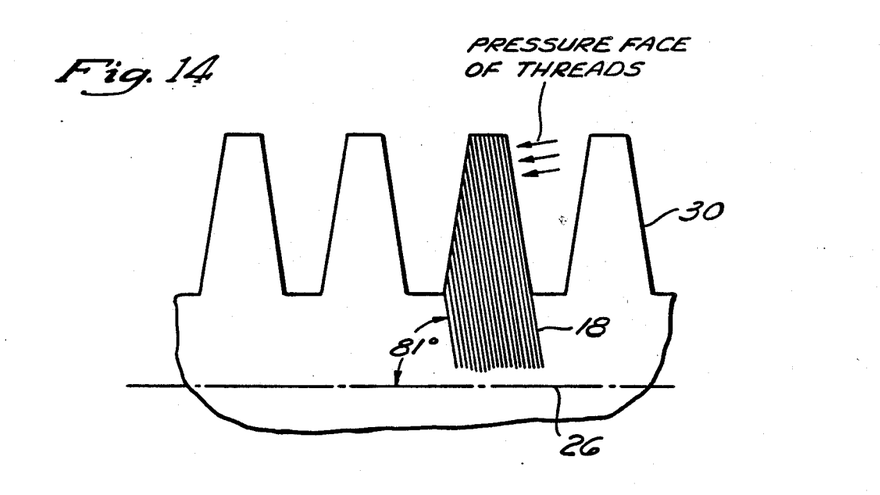

The following description with the related FIGS. 7-14 will help to clarify the relationship between the angle of the face which carries the tension loads and the angle at which plies are laid. These figures show cross-sectional views (parallel to the plane of the laid-up plies) of a correctly cut or ground bolt thread at varying layers or distances from the bolt center line. These distances increase with the figure numbers such that the view in FIG. 7 of that group is closest to the center line, and the view in FIG. 14 is the furthest. These figures illustrate how the thread profiles vary in appearance when viewed in those planes and they schematically illustrate the orientation of the fibers in the ply and how they are parallel to the load-bearing thread face.

Figure 7:
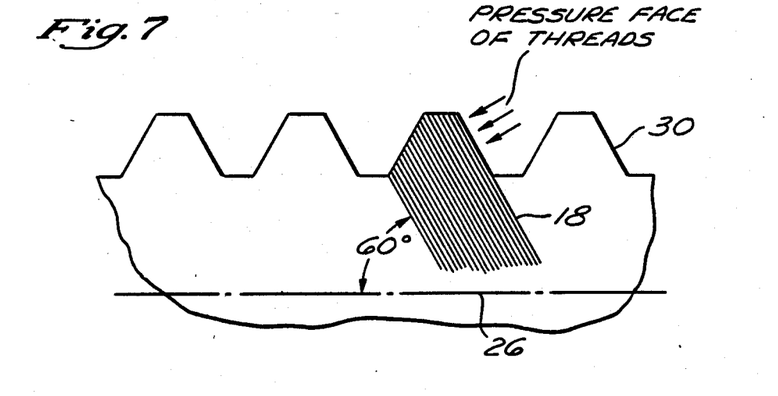

FIG. 7 shows the cross section at 0.005 inch above the bolt center line 26 and center plane 34 in accordance with the exemplary dimensions discussed above for a prototype of the invention. This view corresponds in location to that shown in FIG. 6a. Note that the angle between the thread faces (which carries the tension loads) and the bolt axis 26 in this plane is +60°. To provide optimum tension strength, the 0.005 inch thick ply at this plane, occupying the position 0.000 inch to 0.005 inch distant from the bolt axis is laid so that the fibers are also at a 60° angle to the bolt axis.

Figure 8:
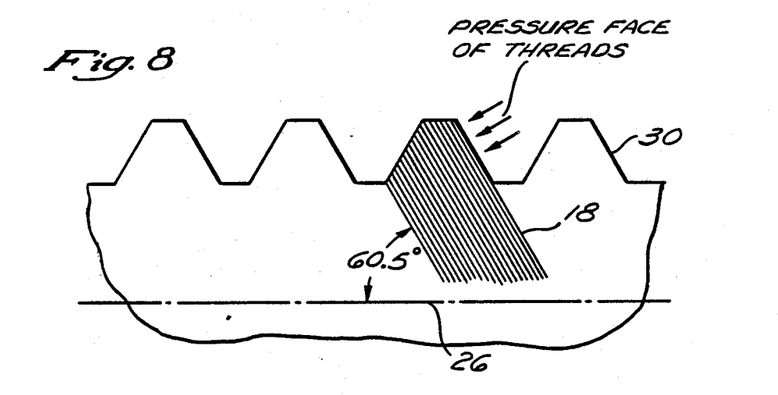
FIG. 8 is an enlarged view of the thread profile shown in FIG. 6d.

FIG. 8 shows a cross section (again parallel to the plane of the laid-up plies) of a correctly cut or ground bolt thread 0.015 inch from the bolt center line. Note that the angle between the thread face which carries the tension modes in this plane is 60.5° to the bolt axis. To provide for optimum tension strength, the plies correspondingly on either side of this plane 0.015 distance from the bolt axis are laid so that the fibers are also at 60.5° to the bolt axis. This view corresponds to that of FIG. 6d, and also 6c with the negative angle.

Figure 9:
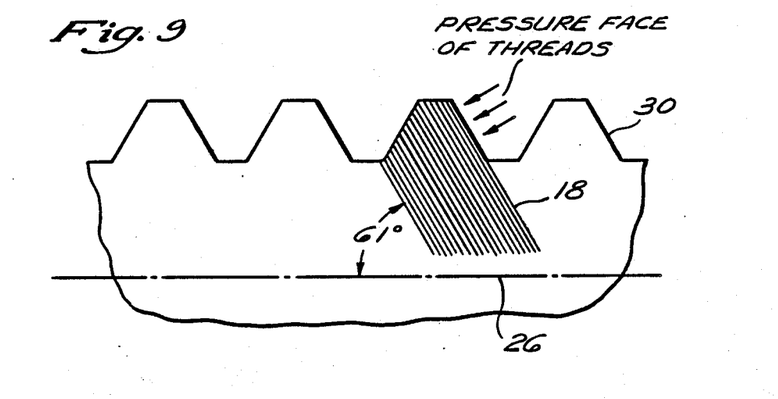
FIGS. 9–14 are additional enlarged views of the thread profile taken along planes parallel to a central horizontal plane at successively increasingly distances from the center of the fastener.

Similarly, FIG. 9 shows a cross section at 0.030 inch from the bolt axis. The angle of the thread face carrying the tension load is 61° to the bolt axis at this location, and the plies on either side of this plane are laid at 61° to the bolt axis to provide optimum tension strength.

FIGS. 10-14 show cross sections at 0.045, 0.60, 0.075, 0.090 and 0.105 inch from the bolt axis and corresponding load carrying thread face angles as follows: t,0100

Note that the plies on either sides of the planes at the various cross sections are laid at the same angle to the bolt axis (in +or −directions) at the load carrying thread face angles. In this manner, optimum thread tension strength is obtained.

The concept of the +and −fiber angles at the various planes may be better understood by referring again to FIG. 6. It can be noted from FIG. 6d that it is only on one side of the thread face that the fibers are oriented the same as the thread face angle. The fibers on the other side are not so oriented. However, the fibers of the ply shown in FIG. 6c are the reverse. Thus, at the plane between the two plies, that is 0.015 inch from the center, there are fibers oriented in the desired direction on each side of the thread. Correspondingly, there is a similar situation on the other half of the bolt, that is the lower half of the bolt as viewed in FIG. 6, wherein at 0.015 inch from the center line there are fibers on one side that are parallel to the thread face and fibers on the other side from the adjacent ply which are parallel to the thread face on that side.

From the foregoing, a desired pattern of orienting the plies can be seen. That is, the plies as illustrated in FIG. 6a and 6d are oriented and should be parallel to the thread face on one side of the bolt. Similarly, the fibers as illustrated in FIGS. 9-14 are similarly oriented except for the increasing thread angle. Thus, it can be seen that every third ply has its fibers oriented in the desired fashion on one side of the bolt and every third ply on the other side of the bolt is so oriented.

It can also be stated that each pair of plies having the angled fibers in the +and −directions is separated by a ply having fibers in the zero direction. Note in this regard that the lower ply 11 illustrated in FIG. 5 has its fibers oriented the same as the fibers and in the ply of FIG. 6a, except in the reverse direction. This pattern is repeated to the ply illustrated in FIG. 14, but the remaining outer plies, as mentioned above, have the fibers oriented at a 0° with respect to the bolt axis.

It should be understood that if plies of different thicknesses than that mentioned above are employed, and bolts of different diameters are formed, the fiber orientations will vary accordingly as will the number of plies utilized. Also, the pattern of having each third ply with its fibers oriented in a similar direction, except for accommodating the changing thread face angle at the different distances from the center, may be modified because of thickness, and more plies may be utilized with the fibers extending parallel to the axis. However, it is believed that the pattern described optimizes the strength of the bolt.

What is claimed is:

1. An article of manufacture comprising an elongated pin having a central longitudinal axis, said pin being formed of planar plies of tape that are bonded together to form a rigid composite structure with said plies being parallel to each other and to said axis, said plies being planar across the width of the pin, each of said plies comprises elongated filament fibers substantially all of which extend generally parallel to each other and which are coated and joined with a suitable bonding agent, a portion of said plies being oriented so that their fibers extend generally parallel to said axis to maximize tensile strength in said pin, and a portion of said plies being oriented so that their fibers are at an angle greater than 0° with respect to a line in the plane of each of the respective plies which have angled fibers, said line being parallel to said axis.

2. The article of claim 1, wherein a thread is formed on said pin in the side edges of said plies, said thread having a face for receiving tension loads on said pin, the angled fibers of a particular ply are substantially parallel to the portion of said thread face which is in the plane of said particular ply.

3. The article of claim 1, wherein a substantial portion of said plies with angled fibers are positioned adjacent a ply not having angled fibers.

4. The article of claim 1 wherein a first ply adjacent the central plane parallel to said plies and through said axis has its fibers extending at an angle with respect to said line in said first plane which is parallel to said axis.

5. The article of claim 4, wherein said pin has a thread formed thereon having a face for receiving tension loads on said pin, and said first ply angle is substantially equal to the angle of said thread face in the plane of said first ply.

6. The article of claim 5, including a second ply adjacent to said first ply with the fibers in said second ply extending generally parallel to said axis.

7. The article of claim 6, including a third ply adjacent to said second ply having angled fibers that extend at an angle with respect to a line in said third ply which is parallel to said axis, said angle in said third ply being slightly greater than the angle of the fibers in said first ply and being substantially equal to the angle of said thread face in the plane of said third ply, and said angle of said third ply being on the opposite side of said line in said third ply which is parallel to said axis with respect to said first ply fiber angle.

8. The article of claim 7 including a fourth ply adjacent the third ply having fibers oriented at an angle of the same magnitude as said third ply fibers and being on the opposite side of a line in said fourth ply which is parallel to said axis with respect to said third ply fiber angle.

9. The article of claim 7, including a plurality of additional plies extending further outward from said central plane with the plies being arranged so that a ply with fibers parallel to said axis is adjacent to pairs of plies having fibers which are angled with respect to lines in their respective planes and parallel to said axis, and the angle of said angled plies progressively increases for a plurality of pairs of plies positioned further from said central plane.

10. The article of claim 7, wherein the furthermost ply from said central plane has fibers which extend parallel to said axis.

11. The article of claim 7, wherein said thread is cut into said pin and the several plies which are furthest from said central plane each have their fibers extending generally parallel with respect to said axis.

12. A method of making an article of manufacture, comprising:
stacking a series of tape plies made of a plurality of elongated filament fibers substantially all of which in a particular ply extend generally parallel to each other and which are coated and joined with a suitable bonding agent;
bonding the tape plies together to form a multiple ply composite rigid structure;
cutting a section of said structure into the form of an elongated rod or pin having a central longitudinal axis, with said plies being planar and extending across said pin parallel to said axis; and
forming a thread on the exterior of said pin;
said stacking step including stacking said plies so that the fibers in some plies are oriented to enhance the shear strength of said pin, and the fibers in some plies extend at an angle with respect to a line in the respective plies parallel to said axis to enhance the strength of the thread to resist tension loads on said pin.

13. A method of making an article of manufacture, comprising:
stacking a series of tape plies having elongated filament fibers substantially all of which in a particular ply extend generally parallel to each other and which are coated and joined with a suitable bonding agent;
bonding the tape plies together to form a multiple ply composite rigid structure; and
cutting a section of said structure to the form of an elongated rod or pin having a central longitudinal axis, with said plies being planar and extending across said pin parallel to said axis;
said stacking step including orienting a portion of said plies so that their fibers are extending generally parallel to said axis and a portion of said plies are oriented so that their fibers extend at an angle greater then 0° to said axis.

14. A method of making an article of manufacture, comprising:
stacking a series of tape plies having elongated filament fibers substantially all of which in a particular ply extend generally parallel to each other and which are coated and joined with a suitable bonding agent;
bonding the tape plies together to form a multiple ply composite rigid structure;
cutting a section of said structure to the form of an elongated rod or pin having a central longitudinal axis, with said plies being planar and extending across said pin parallel to said axis; and
forming a thread on the exterior of said pin having a face for receiving tension loads applied to said pin, and said plies being oriented so that a first portion of said plies have their fibers extending parallel to said axis, and a second portion of said plies have their fibers oriented genreally parallel to said thread face in the respective plane of each ply of said second portion of plies, said face being at an angle with respect to said axis.

15. The method of claim 14 wherein said plies are generally parallel to a central plane including the axis of said pin and the plies are alternatively arranged with a ply with fibers extending generally parallel to the axis and a pair of plies with fibers generally parallel to said thread face but with the angle of adjacent plies of said pair being opposite to each other with respect to said axis.

16. The method of claim 15 wherein the pairs of plies having angled fibers are sequentially spaced outwardly from said central plane with the fibers of each successive pair arranged at an angle increasing in magnitude with respect to said axis.

17. A method of forming a threaded fastener, comprising:
stacking a plurality of planar tapes, each formed of a plurality of elongated fibers substantially all of which extend generally parallel to each other in a particular plane and are coated and bonded together by a suitable bonding agent;
orienting said tapes so that a first portion of said tapes have their fibers extending parallel to a predetermined axis;
orienting a second portion of the tapes so that the fibers in said second portion extend at an angle greater than 0° with respect to said axis;
heating and compressing said tapes to form a rigid composite multiple panel;
slicing a rectangular rod from one edge of the panel with the rod containing a section of each of the tapes and with the rod having an axis parallel to said predetermined axis;
machining said rod into a cylindrical pin; and
forming a thread on the exterior of said pin, said second portion of tapes having been oriented so that their fibers extend at an angle substantially equal to the angle of the face of the thread in the respective planes of said second portion of tapes.

18. A fastener comprising a substantially cylindrical body formed of a plurality of elongated fibers that are bonded together to form a rigid composite structure, a thread formed on the cylindrical exterior of said body having a load bearing face adapted to receive tension loads applied to said body, a substantial first portion of said fibers extending parallel to each other and forming a plane extending across said body parallel to the central axis of said body, the fibers in said plane extending generally parallel to the portion of said load bearing face in said plane to resist tension forces on said body tending to axially shear said thread from said body.

19. The fastener of claim 18, wherein a substantial second portion of said fibers extend parallel to said axis.

20. The fastener of claim 18, including a plurality of planes formed by said fibers extending generally parallel to the portion of said load bearing face in said respective planes, said planes extending parallel to the axis of said body.

21. The fastener of claim 20, wherein a substantial second portion of said fibers extend parallel to said axis and form planes that extend parallel to said axis, with a substantial number of said planes with fibers parallel to said axis being positioned adjacent to the planes of fibers extending parallel to said load bearing face.

22. The fastener of claim 18, wherein said body is formed of a plurality of plies of tape that are bonded together to form said composite structure, each of said plies of tape having a plurality of said elongated fibers, substantially all of which in a particular ply extend generally parallel to each other and which are coated with a suitable bonding agent, said plies being planar and extending parallel to each other and to the axis of said body.

23. A method of making a composite threaded fastener comprising:
   forming a substantially cylindrical body of a plurality of elongated fibers that are bonded together to form a rigid composite structure; and
   forming a thread on the cylindrical exterior of said body with said thread having a load-bearing face adapted to receive tension loads applied to said body;
   said forming step including arranging a substantial first portion of said fibers to extend parallel to each other to form a plane extending across said body parallel to the central axis of said body, with the fibers in said plane extending generally parallel to the portion of said load-bearing face in said plane, to resist tension forces on said body tending to axially shear said thread from said body.

* * * * *

UNITED STATES PATENT AND TRADEMARK OFFICE
CERTIFICATE OF CORRECTION

PATENT NO. : 4,909,690
DATED : March 20, 1990
INVENTOR(S) : Gapp, et al.

It is certified that error appears in the above-identified patent and that said Letters Patent is hereby corrected as shown below:

In Column 2, line 65, change "but at one" to --but one--.

In Column 3, line 5, change "the the plane" to --the plane-.

In Column 3, line 39, change "this tapes" to --thin tapes--.

In Column 4, line 34, change "this the longitudinal" to --this longitudinal--.

In Column 4, line 43, change "The fourth ply has" to --The fourth ply 16 has--.

In Column 4, line 61, change "1/8 inch." to --1/8 inch approximately--.

In Column 5, line 16, after "laid" insert --These figures illustrate the cut thread embodiment.--

In Column 5, line 55, cancel "t,0100."

UNITED STATES PATENT AND TRADEMARK OFFICE
CERTIFICATE OF CORRECTION

PATENT NO. : 4,909,690

DATED : March 20, 1990

INVENTOR(S) : Gapp, et al.

Figure 10:
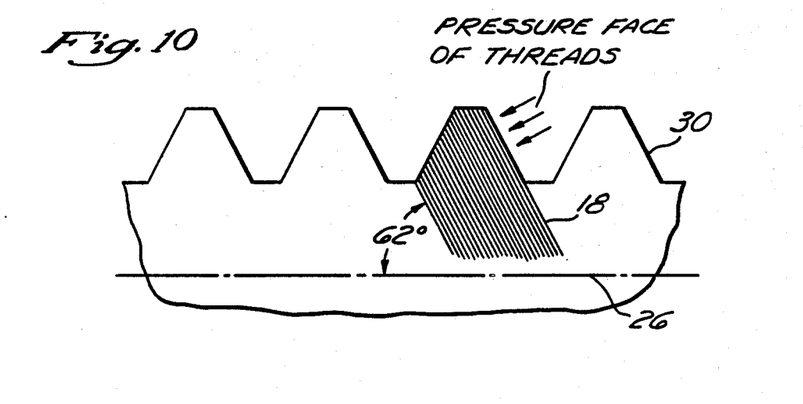
Figure 11:
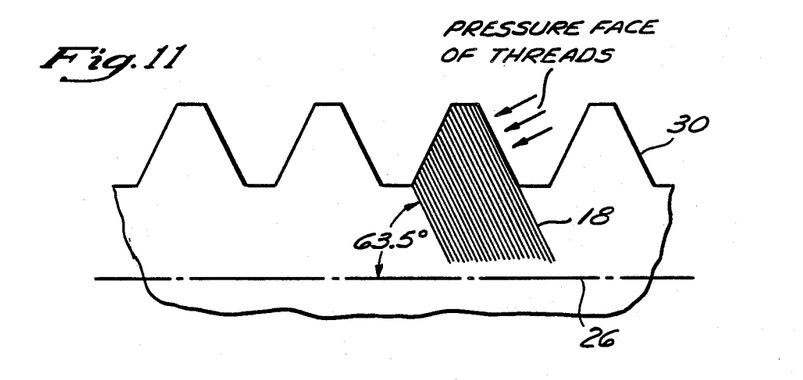
Figure 12:
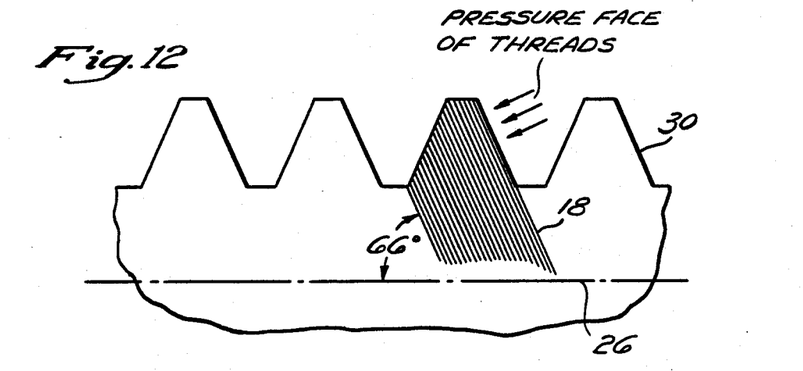
Figure 13:
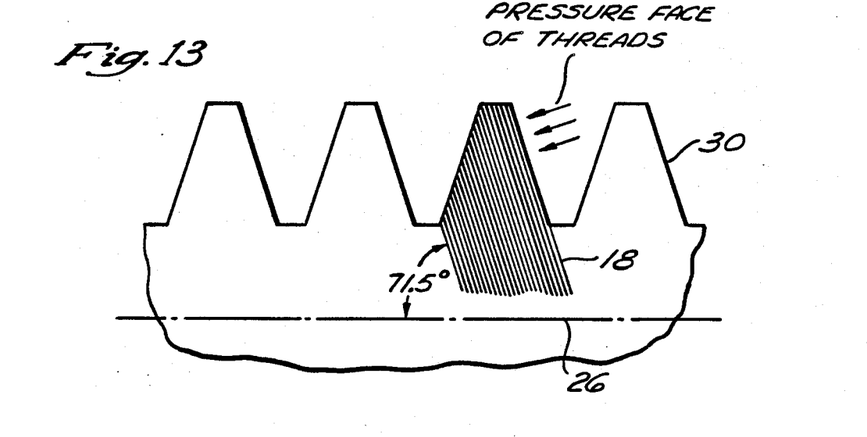

It is certified that error appears in the above-identified patent and that said Letters Patent is hereby corrected as shown below:

```
In Column 5, after line 55, insert:
     Figure 10    .045    62°
     Figure 11    .060    63.5°
     Figure 12    .075    66°
     Figure 13    .090    71.5°
     Figure 14    .105    81°
```

Signed and Sealed this

Twenty-eighth Day of April, 1992

Attest:

HARRY F. MANBECK, JR.

*Attesting Officer*    *Commissioner of Patents and Trademarks*